2,844,032

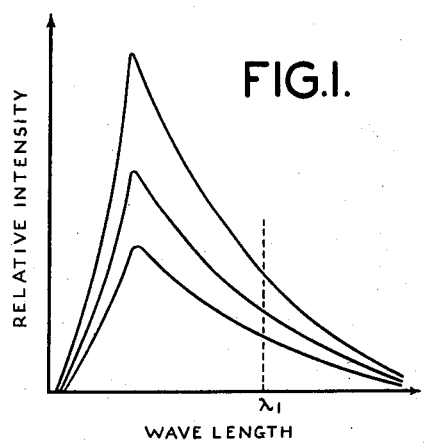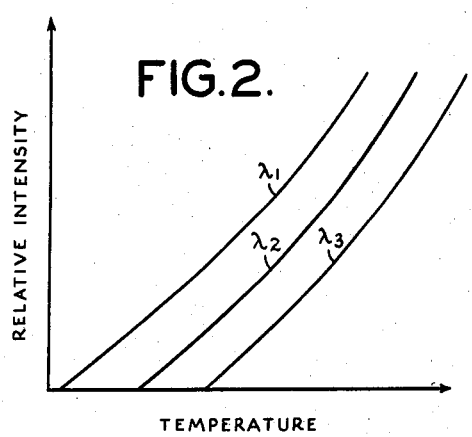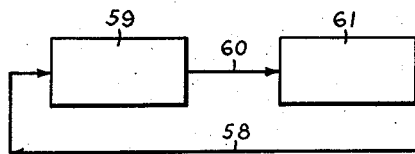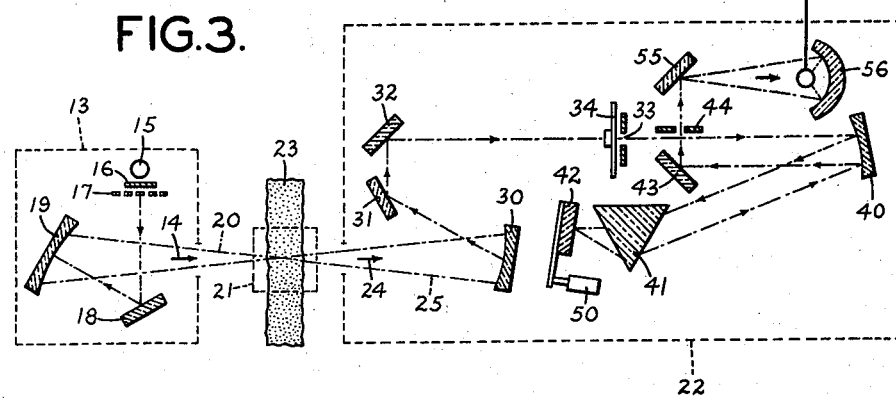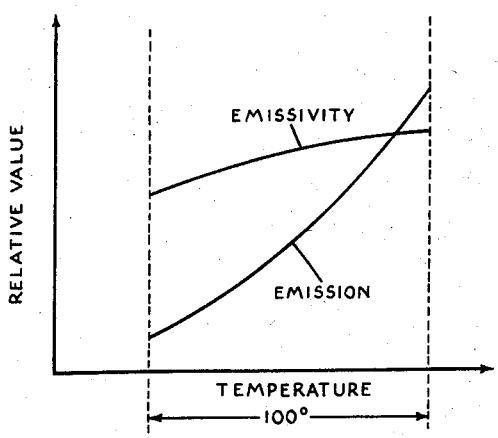
INVENTORS
WILLIAM S. TANDLER
MORRIS GROSSMAN
BY RICHARD H. TOURIN
THEIR ATTORNEYS

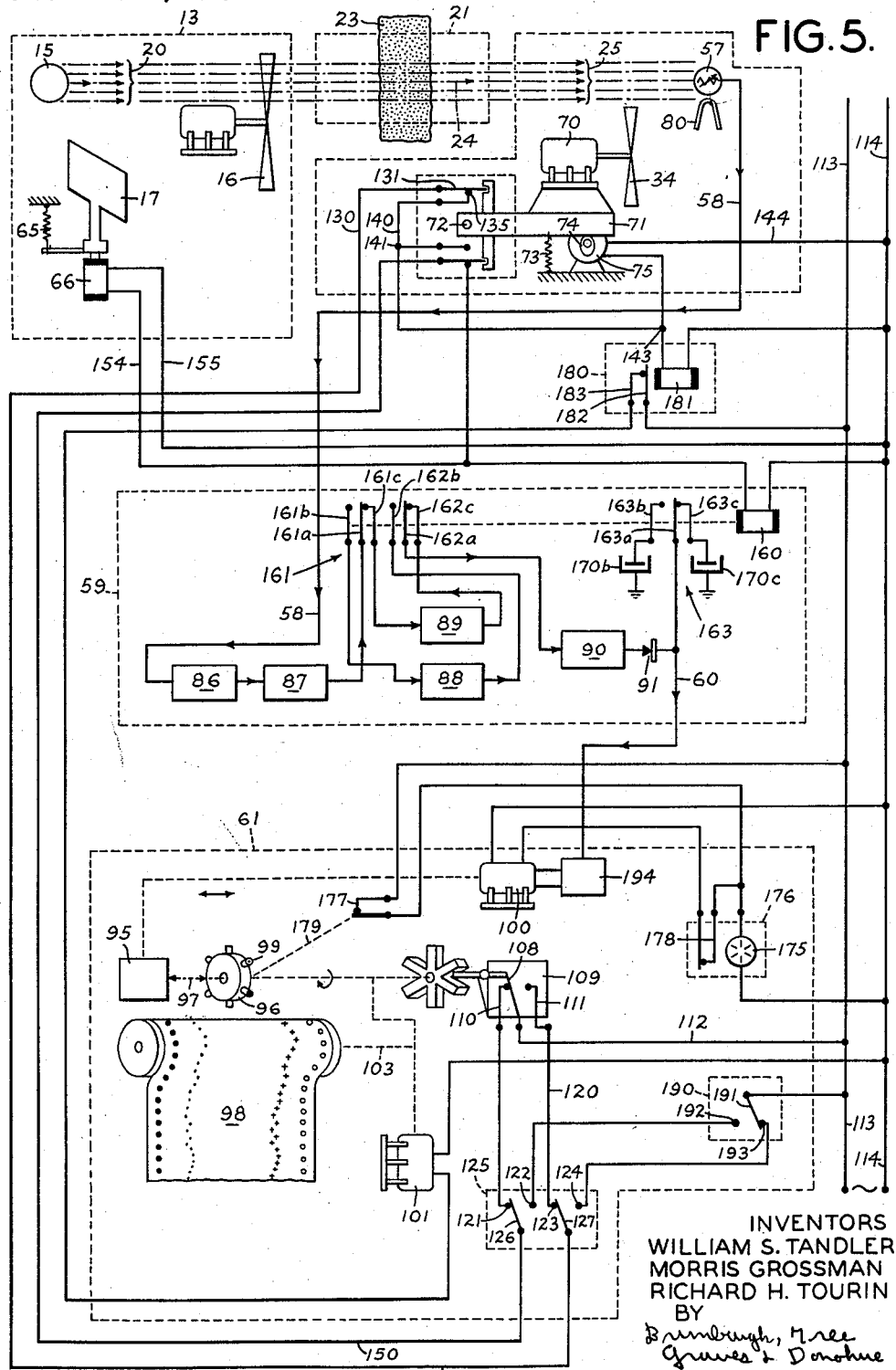

RADIANT ENERGY MEASUREMENT SYSTEM

William S. Tandler, New York, Morris Grossman, Brooklyn, and Richard H. Tourin, Flushing, N. Y., assignors to The Warner & Swasey Research Corporation, Cleveland, Ohio, a corporation of Ohio Application January 31, 1955, Serial No. 484,884

12 Claims. (Cl. 73—355)

This invention relates generally to radiant energy measurement methods and apparatus, and more particularly to methods and apparatus of this character for obtaining an indication determinative of the temperature of hot bodies.

Disclosures which are related in part to that of this application appear in applicants' copending applications, Serial Nos. 484,982 and 485,262, both filed on January 31, 1955.

In measuring the temperature of combustion reaction gases or other very hot bodies, the measurement conditions are often such as to exclude the use of conventional measuring instruments operative by direct contact with, or introduction into the body. This is so, since, for example, such conventional instruments cannot withstand, without injury, direct exposure to the high temperatures involved. Thus, it becomes necessary to make hot body temperature determinations by radiant energy measurement at a distance. Such radiant energy measurements have, however, not previously been used extensively for gases for the reason that no satisfactory methods and apparatus have been developed in the prior art for obtaining measurements fully determinative of the temperature of the hot body.

It is an object of this invention, accordingly, to provide radiant energy measurement methods and apparatus adapted to give one or more measurements fully determinative of the temperature of an observed hot body.

Another object of this invention is to provide methods and apparatus of the above-noted character wherein substantially simultaneous readings may be taken of a plurality of quantities conjointly determinative of the mentioned temperature.

Yet another object of the invention is to provide methods and apparatus of the above-noted character characterized by elimination of factors extraneous to the mentioned temperature determination.

A further object of the invention is to provide methods and apparatus of the above-noted character wherein the mentioned temperature determination may be made by measurement of a single quantity determinative thereof.

These and other objects of the invention are realized by methods and apparatus wherein radiant energy, extending over a range of wavelengths in the infra-red spectrum and radiating outward from the hot body, is collected at a distance from the hot body into an optical path. The radiant energy in the whole range of wavelengths is then filtered to select therefrom only radiant energy in a band of wavelengths significantly correlated with the temperature of the hot body. Thereafter, the radiant energy in the selected band of wavelengths is caused to generate one or more electrical signals which are further modified to provide one or more indications determinative of the temperature of the hot body.

As a feature of the invention, the radiant energy may take the forms of energy absorbed by the hot body and energy emitted by the hot body, the two forms of radiant energy differing by a given characteristic permitting discrimination therebetween.

As another feature of the invention, the form of radiant energy representing emission from the hot body may be used alone to provide an indication determinative of the temperature of the hot body.

The invention may be better understood from the following detailed description of representative embodiments thereof taken in conjunction with the accompanying drawings wherein:

Figs. 1 and 2 are graphs explanatory of certain aspects of the invention;

Fig. 3 is a plan view in schematic form of apparatus in accordance with the invention;

Fig. 4 is a graph explanatory of a method in accordance with the invention; and

Fig. 5 is a schematic diagram of certain details of the apparatus of Fig. 3.

Considering the phenomenal basis for the present invention, it is an experimental fact that all hot combustion gases emit radiation as a result of their temperature, and that this radiation occurs at certain narrow bands in the infra-red region of the spectrum. The radiation is contributed by all polyatomic and heteronuclear diatomic molecular species present in the gas, e. g., $CO_2$, OH. Homonuclear molecules, such as $N_2$ and $O_2$ do not radiate. The method involves two basic physical laws: Planck's law and Kirchhoff's law.

All emitters of thermal radiation (heat radiation) give off energy in accordance with the following law:

$$I_\lambda = e_\lambda J_\lambda = e_\lambda [c_1 A \lambda^{-5} (\epsilon^{c_2/\lambda T} - 1)^{-1}] \quad (1)$$

where $I_\lambda$ = spectral radiant intensity of the emission. Spectral radiant intensity is defined as the energy per unit spectral bandwidth emitted by the source in one second through unit solid angle $J_\lambda$ = spectral radiant intensity of a "blackbody" radiator, defined below $e_\lambda$ is called the emissivity, and is a quantity (of a value less than or equal to one) characteristic of the material (gas, liquid or solid).

$c_1$ and $c_2$ are physical constants.

$A$ is the area of the hot surface.

$\lambda$ is the wavelength of the radiation.

$\epsilon$ is the base of natural logarithms.

$T$ is the absolute (Kelvin) temperature.

The quantity in square brackets is called the Planck function. When the emissivity, $e=1$, the formula becomes $$I_\lambda = J_\lambda = c_1 A \lambda^{-5} (\epsilon^{c_2/\lambda T} - 1)^{-1} \quad (2)$$

This is known at the Planck radiation law. No real physical object radiates exactly in accordance with this law. The Planck law is followed exactly only by an ideal thermal radiator, called a blackbody. A blackbody is defined as an object which absorbs all radiation received by it. Most objects actually reflect some of the radiation they receive, and transparent materials also transmit some radiation. The closest physical approximation to a blackbody is a small hole in a closed cavity, since radiation entering such a hole is unlikely to find its way out again. The fraction of incident radiation absorbed by an object is called its absorptivity. By definition a blackbody has an absorptivity equal to one, or 100%.

A plot of Equation 2 is shown in Fig. 1 for three temperatures $t_1$, $t_2$, $t_3$. A continuous family of such curves exist for all values of temperature.

The second physical law of importance is Kirchhoff's law. This can be stated in two ways. First, if $I_\lambda$ is the spectral radiant intensity of radiation emitted from an object and $a_\lambda$ is the absorptivity of the object, then $$\frac{I_\lambda}{a_\lambda} = J_\lambda \qquad (3)$$

In other words, the ratio of spectral radiant intensity to absorptivity equals the spectral radiant intensity of a blackbody at the same temperature. The second way of stating Kirchhoff's law is to start by defining the emissivity factor, $e_\lambda$, of Equation 1 as the ratio of the spectral radiant intensity of a hot object to the spectral radiant intensity of a blackbody at the same temperature. Then Kirchhoff's law becomes $$e_\lambda = a_\lambda \qquad (4)$$

Attention is now called to the subscript which occurs in $e_\lambda$ and $a_\lambda$. This subscript signifies that the quantities refer to radiation of a specific wavelength or narrow wavelength band, not to total radiation. The fact is that Equations 3 and 4 generally hold only for single wavelengths or narrow wavelength bands. There are materials, called "gray bodies" which obey Kirchhoff's law over a wide range of wavelengths, but gases do not.

In the general terms of abstract quantitative values, temperature is determined according to the invention as follows. Referring to Equation 3, the values $I_\lambda$ and $a_\lambda$ of the hot body at a specific temperature are determined. From these values is calculated the ratio $I_\lambda/a_\lambda$, to determine $J_\lambda$. Finally with the entries $J_\lambda$ and wavelength $\lambda$, the temperature is read off on the blackbody curve. For greatest convenience in making such entries, the data shown in Fig. 1 are plotted in the graphs shown in Fig. 2 for the wavelength values $\lambda_1$, $\lambda_2$, $\lambda_3$, for example. It will be understood that the number of such curves can be increased indefinitely. The data for a given curve in Fig. 2 may be obtained by reading off points along a line such as the dotted line in Fig. 1.

Referring now to Fig. 3 which shows one form of apparatus suitably used in conjunction with the above described procedure, the numeral 13 designates a unit adapted to act as a source for a beam 20 of infra-red radiation 14. To this end the source unit 13 includes an element 15, as, say, a Nernst glower or other glower, adapted to emit radiant energy. Measurements may be made according to the invention if this radiant energy is within the wavelength range of 1–5 microns in the infra-red spectrum. The radiant energy emanated from glower 15 follows an optical path including the following elements: a motor-driven source shopper 16, a shutter 17, a flat infra-red mirror 18 and a spherical condenser mirror 19 also reflective of infra-red energy. The spherical mirror 19 projects the beam 20 of infra-red radiation from source unit 13 through a sampling region 21 to the receiver unit 22.

The term "sampling region" is used here for convenience in describing the invention. The measurement is performed without disturbing or acting upon the hot body in any way, other than to pass a beam of radiation through it, and the sampling region may be located at any conveniently accessible portion of the hot body; it is not meant here to imply by the word "sampling" that a sample of the hot body must be taken out for measurement.

The sampling region 21 contains the hot body whose temperature is to be determined. This hot body may be, for example, a very hot gas 23.

During passage through region 21 of the infra-red beam 20, the radiant energy thereof undergoes absorption at certain discrete wavelengths of the spectral distribution range of the radiant energy. As stated, the wavelengths at which absorption takes place are characteristic of the constituent gaseous components of the gas 23. One of these absorbed wavelengths is used in the course of a measurement as a reference wavelength for temperature determination.

Gas 23, being at very high temperature, will also emit infra-red radiation over a spectral distribution range at particular wavelengths characteristic of its constituents and corresponding in value with the absorption wavelengths of these constituents. It follows that the beam departing from gas 23 always includes a quantity of emission radiation 24 at the reference wavelength. When source unit 13 is not operating, the beam 25 entering receiver unit 22 is constituted entirely of this emission radiation 24. On the other hand, when source unit 13 is operating, the beam 25 entering receiver unit 22 will be constituted in part of emission radiation 24 and in part of the source radiation 14 subject to absorption in region 21.

The infra-red beam 25 entering receiver unit 22 follows an optical path which includes the following infra-red reflective elements: a spherical condenser mirror 30, a plane mirror 31 and another plane mirror 32. The last-named elements together with the optical elements of source unit 13 are of such characteristic in configuration and spacing to focus an incandescent image of the glower source 15 upon an entrance slit 33 marking the beginning of a monochromator section in receiver unit 22. Interposed in the optical path between mirror 32 and slit 33 is a motor-driven receiver chopper 34 whose function will be described hereafter.

Within the monochromator section, radiation framed by the illuminated entrance slit 33 illuminates a collimator mirror 40 which sends a beam of parallel radiation to a prism 41. The prism 41 disperses into component wavelengths the spectral distribution range of the radiant energy within the beam. The dispersed radiation from prism 41 impinges upon a Littrow mirror 42 which reflects the dispersed radiation back upon the prism. The dispersed radiation thereby goes through prism 41 a second time, undergoing further dispersion, and is returned to the collimator mirror 40. Mirror 40 focuses the radiation back in the general direction of the entrance slit 33, but before reaching the same, the retrogressive beam from mirror 40 is intercepted by the plane mirror 43 and directed to the exit slit 44 marking the end of the monochromator section.

The prism 41 has the effect of "fanning out" the radiation beam incident thereon so that each wavelength in the spectral distribution range of the beam is represented by a fan of radiation leaving the prism at a different angle to the prism face. Only one of these fans of differing wavelength radiation falls on the Littrow mirror 42 at a proper incident angle for the radiation in the sector to be reflected back from the Littrow mirror along the described optical path to pass through exit slit 44. Accordingly, the radiation beam traversing this slit is composed of radiant energy occupying only a very narrow band of wavelengths compared to the original spectral distribution range of the energy in the beam traversing the entrance slit 33.

It will be seen, by shifting the angular position of the Littrow mirror 42 through an adjusting micrometer 50, that is possible to shift the position in the infra-red spectrum of the selected band of wavelengths. In a practical measuring operation the Littrow mirror is adjusted so that the monochromator section acts as a filter to pass only a band of wavelengths centered about the selected reference wavelength of significance to the temperature measurement of gas 23. As stated, a wavelength significant for this purpose would be the common value absorption and emission wavelength of a given constituent of the gas. Thus, if gas 23 represents the products of a combustion reaction, the selected reference wavelength may be one of the infra-red absorption and emission wavelengths for carbon dioxide or water vapor.

It will also be seen that the width of the band of wavelengths depends upon the optical characteristics of the elements in the monochromator section, particularly the widths of entrance slit 33 and exit slit 44 in their dimensions crosswise to the optical path. Within the contemplation of the invention, the width of the passed wavelength band is of 0.002 micron at the least. This specified bandwidth value, although relatively small compared to the 1–5 micron spectral distribution range over which the reference wavelength may be selected according to the present invention, is relatively large compared to the 0.00007–0.0002 micron bandwidth which would be used if it were desired to resolve into its fine structure the infra-red radiation entering the receiver unit 22.

As a practical matter, a narrow band of wavelengths may be considered to act, for most of the purposes of the invention, as if all the radiant energy in the band were manifested at the center wavelength. Accordingly, unless otherwise required by the context, it will be understood that observations concerning the "reference wavelength" are to be construed as applying to a band of wavelengths having the reference wavelength for a center value.

With the radiation beam having been limited, as described, to radiant energy of the reference wavelength, the beam passes through the exit slit 44 and along an optical path including the plane mirror 55 and the ellipsoidal condenser mirror 56. Mirror 56 focuses the radiation upon a detector 57 which is preferably a photosensitive device responsive to infra-red as, say, a lead sulfide cell, but which may be another type of infra-red sensing means as, say, a thermocouple or a bolometer. The detector 57 responds to the incident beam by developing an electrical signal in accordance with the intensity of the incident radiation. The electric signal so developed is supplied via electrical coupling means 58 to an amplifier unit 59 to be later described in greater detail. The amplifier unit 59 is coupled by electrical coupling means 60 with a registering unit 61, to be later more fully described, adapted to perform a registering action in the nature of indicating and/or recording and/or a similar operation. In the presence of the signal from detector 57, the amplifier unit 59 and registering unit 61 cooperate together to provide a reading or readings representing the intensity of the detected radiation.

The described apparatus may be utilized in conjunction with the carrying out of both "double-sided" and "single-sided" methods for determining the temperature of the hot gas 23 in sampling region 21. For an understanding of the basis for one double-sided method, assume that initially the source unit 13 is operated without any gas 23 being present in the sampling region 21. Assume, also, that the glower source 15 emanates infrared radiation at reference wavelength with an intensity value of $I_0$. The registering unit 61 will, accordingly, provide a reading representing $I_0$.

With $I_0$ determined, the hot gas 23 is streamed through region 21 while source unit 13 is operating to produce its radiation beam 20. In response, the registering unit gives a reading representative of $(I+I_\lambda)$ where $I_\lambda$ is, as defined, the intensity of radiation emitted from gas 23, and $I$ is the intensity of the source radiation after absorption. Thereafter, the beam from source unit 13 is shut off while the hot gas 23 is still streamed through region 21. In response, the registering unit 61 now gives a reading representative of $I_\lambda$ only.

From the three readings thus obtained, the temperature of gas 23 may be determined as follows. The reading $I_\lambda$ is subtracted from the reading $(I_\lambda+I)$ to give the value $I$. From the value $I$ and the reading $I_0$ the absorptivity value, $a_\lambda$, can be determined by the following equations $$I = I_0(1 - a_\lambda) \quad (5)$$

$$a_\lambda = 1 - \frac{I}{I_0} \quad (6)$$

Having determined $a_\lambda$, the value of the ratio $I_\lambda/a_\lambda$ is calculated. From Equation 3 the value of this ratio equals $J_\lambda$. Using the wavelength value $\lambda$ as the reference wavelength and the determined value of $J_\lambda$, the graph in Fig. 2 is entered to determine the temperature of gas 23.

From the nature of the described apparatus, it will be evident that the readings obtained by registering unit 61 represent relative rather than absolute indications of the values of the variables entering into the determination of gas temperature. Accordingly, it is necessary that the apparatus be calibrated to establish a correlation between the obtained readings and the scale values of the graph in Fig. 2. This calibration may be effected in accordance with a procedure discovered by the applicants and outlined in a publication entitled, "Infra-Red Monochromatic Radiation Methods," published in May 1950 by the Wright-Patterson Air Force Base, Dayton, Ohio, as Air Force Technical Report No. 6064. The essential features of this calibration are the calculation, from measurement of radiant emission at a single temperature from a standard radiation source, of a complete curve of equivalent black body intensity against temperature for the measuring apparatus. This standard radiation source may be any suitable radiation source, the temperature of which can be determined by an optical pyrometer, using a filter of equivalent wavelength, 0.667 micron, as prescribed by the International Temperature Scale of 1948.

The procedure of calibration outlined in the mentioned publication, inasmuch as it involves accurate extrapolation by calculations from a single measured temperature value, extends the range of determinable temperature far beyond the usual limit of 1500° C. when the calibration is made by actual measurements of the range of temperatures of a conventional calibrating source, the 1500° C. figure being the highest temperature which can be conveniently reached by such source, and this procedure is simpler and more accurate than actual measurements over the entire range. In fact, according to the present invention, there is no upper limit for the determinable temperature, and, in practice, it has been possible to measure the temperature of combustion gases varying all the way from 600° C.–3550° C.

All of the forms of the double-sided method require determination at reference wavelength of both the emissivity of the gas (by measurement of its absorption) and of the emission of the gas. It has previously been considered that the use of both such factors was necessary because of the previously held belief that temperature was not the sole physical parameter determining the value of these factors, and that, conversely, it was not feasible to work backwards to temperature from one of these factors by way of a simple quantitative correlation. We have discovered, however, in at least the case of the measurement of the temperature of a gas in the nature of a product of a premixed combustion reaction that the values of the factors, temperature, emissivity, and emission all change with a change in the value of the fuel-air ratio of the burning mixture, but that, taking this relation into account, for particular temperature ranges and within acceptable accuracy limits, the temperature variation may be considered as correlated with the emission variation only. This fact is illustrated in Fig. 4. As shown therein, over a relatively small (for example, 100°) temperature range, the emission changes pronouncedly with temperature, but the emissivity remains almost constant. Thus, within this temperature range, to an accuracy of one or two percent, the emissivity can be considered constant. By Equation 4, the emissivity $e_\lambda$ equals the absorptivity $a_\lambda$. Hence, any temperature within this small range can be determined to an acceptable accuracy by using the same value over the entire range for the term $a_\lambda$ in Equation 3, once the proper value for $a_\lambda$ in this range has been ascertained.

It has further been found that at high temperatures the curve of emissivity versus temperature levels off completely (or, in other words, shows saturation), and hence the absorption factor $a_\lambda$ in Equation 3 may be replaced by a constant over a much larger range at high temperatures.

It follows that, within particular ranges wherein the emissivity is or may be considered constant, the temperature of appropriate hot bodies is determinable by a "single-sided" method wherein the source unit 13 is not used, and wherein the radiation entering receiver unit 22 consists entirely of the radiation 24 emitted from the hot body. The intensity of this radiation is, in the usual manner, registered by the registering unit 61. The reading of $I_\lambda$ thus obtained is utilized to determine temperature according to the procedure, heretofore described, of finding $J_\lambda$ and of entering the graph of Fig. 2 with the found value of $J_\lambda$ and with the value of $\lambda$ of the reference wavelength.

Of course, if the actual temperatures within a given "constant" emissivity range are desired, it is necessary to determine, at least once, the actual value of emissivity obtaining at a representative temperature in the range. This emissivity determination may be made, for example, by the preferred form of double-sided method hereafter described. Having once been determined, the emissivity value can be used as a constant to thereafter determine all temperatures in the range.

The single-sided method is of greatest application, not in the measurement of temperatures which may vary much more widely than the variation comprehended by a "constant" emissivity range, but rather in conjunction with a temperature control system which automatically restores a drifted temperature to a reference value. In such mode of control, the largest temperature drift which can occur before correction may be corrected by a temperature determination which assumes that the emissivity is constant. In this application of the single-sided method, it is clear that the absolute value of the temperature measured is of little importance. It is only necessary that the temperature be measured in a relative sense to determine the amount of any drift occurring with respect thereto.

It will be noted in both the case of the basic form of double-sided method and of the single-sided method that the radiation measured by detector 57 occupies a bandwidth of 0.002 micron at the least. The broadness of this bandwidth is advantageous inasmuch as it permits an initial calibration of the apparatus and later measurements by the apparatus at a mean wavelength which, in theory, should be the same for the calibration and for the measurement, but which in the course of the actual measurements may drift away from the calibration value because of slight changes in the optical system and so forth. By employing a relatively broad bandwidth of measured radiation, the error-producing effect of this drift upon the obtained readings is minimized for the reason that the relatively broad bandwidth contains a large number of fine infra-red lines, none of which can individually affect to any great extent the average intensity value of the bandwidth as detected by the detector 57. Hence, a change in composition of the bandwidth by a few infra-red lines from one measurement to another will have a negligible effect upon the accuracy of the readings. On the other hand, were the bandwidth to be so narrow that only a few infra-red lines were contained therein, the intensity of each line would be critical to the measurement, and a change by a few lines in the bandwidth composition, or a slight change in the width itself of the band, would cause a substantial error in the readings. An additional advantage to said broadness of bandwidth is that the optical system required is much simpler than that required to resolve the spectrum into its fine structure components. Still a further advantage is that the energy radiated by the hot body within said bandwidth is sufficient to enable a high degree of accuracy in the measurement, while the energy available from a bandwith including only a few infra-red lines would be too small to measure accurately.

For conversion of the described apparatus from double-sided to single-sided operation, it is necessary only that the beam 20 from source unit 13 be cut off as, by, extinguishing the glower source 15 or by interposing the shutter 17 in the optical path. It should also be noted that both the double-sided method and the single-sided method can be carried out whether the electrical signal from detector 57 is of direct current or alternating current nature. Provision in one manner is made for an alternating current electric signal by the receiver chopper 34 which periodically interrupts the radiation beam 25 to produce pulsations therein. These pulsations cause detector 57 to reproduce the radiation incident thereon as an alternating signal.

While the basic form of double-sided method described above represents the most general method for determining temperature by absorption and emission measurements, the method as heretofore described is characterized by certain disadvantages. For example, if as is usually the case, the separate method steps are carried out manually, the method as a whole is unduly time consuming. Also, since one of the method steps obtains a reading of the value $(I_\lambda+I)$ rather than the ultimately desired value I, in the calculations the additional step is necessary of subtracting the obtained reading of I from the obtained reading of $(I_\lambda+I)$ in order to find the value I. This additional calculation step is disadvantageous, not only because of the extra time and effort required to carry it out, but also because of the possibility of error being introduced into the measurement as a result of the necessity for the step. This error may arise because of a change in the value of $I_\lambda$ during the relatively long time ensuing between the manually undertaken step of obtaining the reading $(I_\lambda+I)$ and the manually undertaken method step of obtaining the reading for $I_\lambda$ alone.

In accordance with the invention the disadvantages just described can be eliminated by a preferred form of double-sided method. The features of the apparatus permitting this method to be carried out will now be discussed.

Referring to Fig. 5, the shutter 17 within source unit 13 has associated therewith an upwardly urging spring 65 and a solenoid 66. When solenoid 66 is unenergized, the spring 65 holds shutter 17 in an upward position wherein the shutter cuts off passage of the radiation beam from glower 15 to sampling region 21. Conversely, when solenoid 66 is energized, the solenoid overcomes the action of spring 65 to hold shutter 17 in downward position wherein the shutter is completely out of beam 20.

In receiver unit 22 the receiver chopper 33 is driven by an electric motor 70 mounted on a cradle 71. One end of cradle 71 is supported by a pin 72 acting as a pivot. The other end of cradle 71 is urged by a spring 73 into continuous contact with an eccentric cam 74 driven by an electric motor 75. Cam 74 is adapted when driven by motor 75 to assume two positions of rest. In the first of these positions the cam holds cradle 71 upwardly tilted so that the receiver chopper 34 is fully in the radiation beam 25. In the second position, cam 74 maintains cradle 71 in a tilted downward position so that the receiver chopper 34 is fully out of the beam 25.

By means later more fully described, there is developed a cycling action wherein for one-half of the cycle both the shutter 17 and the chopper 34 are retracted out of their respective beams. During the other half of the cycle, both the shutter 17 and the receiver chopper 34 extend fully into their respective beams. The receiver chopper 34 is, in the present instance, adapted to chop beam 25 at the same rate as the source chopper 16 (Fig. 3) chops the beam 20. This chopping frequency may be of any convenient value as long as it is larger by a different order of magnitude than the cyclical movements into and out of the beam undergone by shutter 17 and chopper 34. Thus, the chopping frequency may be 30 C. P. S. where the shutter and the chopper each move in and out of the beam at 1 C. P. S.

During the first half cycle wherein both chopper 34 and shutter 17 are respectively inserted into beams 25 and 20, the radiation in beam 25 is composed entirely of the radiation 24 emitted by gas 23 in sampling region 21. Hence, in the first half cycle the detector 57 provides a 30 C. P. S. signal representing, $I_\lambda$, the intensity of this radiation 24. During the second half cycle when both shutter 17 and chopper 34 are positioned out of their respective beams, the radiation beam 25 will consist in part of the emitted radiation 24 and in part of the source radiation 14 after the same has been subjected to absorption by passage through gas 23. Of these two forms of radiation, the source radiation 14 will be chopped at a 30 C. P. S. rate by the action of source chopper 16 but the emission radiation 24 will not be chopped, since the chopper 34 has been removed from the radiation path. Thus, during this second half cycle, the detector 57 develops a desired 30 C. P. S. signal representing the value I of the source radiation, and also an extraneous D. C. signal representing the value of the unchopped radiation 24.

The detector 57 is preferably, as stated, a lead sulfide cell since this form of cell has a maximum sensitivity of response to infra-red radiation. In order that the cell may be stabilized against sensitivity changes because of ambient temperature changes, the cell 57 is, in the present instance, maintained at constant temperature by cooling coil 80 disposed in close proximity with the cell and carrying a circulating supply of a constant temperature fluid as, say, water.

The 30 C. P. S. $I_\lambda$ signal and the combination of the 30 C. P. S. I signal with the extraneous D. C. signal, as respectively developed by detector 57 during the first and second halves of the shutter-chopper cycle, are fed by lead 58 to a pre-amplifier network 86 in amplifier unit 59. This pre-amplifier is adapted to pass only A. C. signals and hence, at the onset, eliminates the mentioned extraneous D. C. signal of the second half cycle. The cyclically alternate $I_\lambda$ and I signals passed by pre-amplifier 86 are fed through an attenuating cathode follower 87 having an output which is connected by a later described switching action to the attenuator networks 88 and 89 during, respectively, the first and second half cycles of the shutter-chopper cycle. Each attenuator network when switched to have its input fed from cathode follower 87 is also switched to have its output connected to an amplifier 90. The amplifier 90 feeds into a rectifying voltmeter circuit 91 which provides over the lead 60 the output for the registering unit 61 about to be described.

The use of separate attenuator networks for the I and $I_\lambda$ signals in the amplifier unit 59 permits the overall gain factor of this unit to be given a value for each signal which is appropriate for that signal but would not necessarily be appropriate for the other signal. Thus network 88 may be proportioned in attenuation effect to give a convenient but otherwise arbitrary value for the I signal, while network 89 will be proportioned to give the appropriate recorded values for $I_\lambda$ signals in accordance with a proper calibration.

The registering unit 61 may, in the present instance, be a two point printer recorder unit, one such suitable unit being described in "specification No. 185" published in March 1948 by the Minneapolis-Honeywell Company at Minneapolis, Minnesota. In this unit the signal on lead 60 is fed to a servo amplifier 194, the output of which is used to operate a slide wire balancing system 95 which in a conventional manner controls a printer wheel 96 through a mechanical linkage represented symbolically in Figure 5 by the dotted line 97. A source of mechanical energy for the balancing system 95 is represented by the balancing servo motor 100 which drives the system through a linkage 104. The organization of elements 95, 96 and 97 is of the well known type wherein the printer wheel moves laterally over a record chart 98 to register on the chart in the course of respective actuations of balancing system 95 by the $I_\lambda$ and by the I signals. The printer wheel moves laterally from a reference position by an amount representing the value of the signal being measured. To provide for distinction between channels, the printer wheel 96 carries an even numbered plurality of printer spokes 99 respectively adapted in alternate order around the wheel, to print two mutually distinct marks as, say, a dot and a cross. Once each half cycle of the shutter chopper-cycle an indexing motor 101 through the linkage 102 indexes the printer wheel 96 to bring a new printer spoke 99 in face down relation to chart 98. At the same time motor 101 through a linkage 103 moves chart 98 ahead by a space. Thereafter by the action of balancing system 95 and linkage 97 the printer wheel 96 is displaced to bring the face down printer spoke 99 in contact with the chart. Accordingly the $I_\lambda$ signals and I signal developed during the first and second halves of the shutter-chopper cycle will be represented on chart 98 by, say, the series of dots and the series of crosses respectively appearing on the chart. It will be seen, providing that a reasonably rapid shutter-chopper cycling speed is used, that the described recorder unit will provide essentially continuous displays of both of the values $I_\lambda$ and I.

Considering now the way in which the shutter-chopper cycling action is developed by the recorder unit, at the end of the second half of a previously occurring shutter-chopper cycle a value for I will just have been recorded, and the apparatus will still be in the condition shown in Figure 5. Specifically, the solenoid 66 will be energized to hold shutter 17 downward, the cam 74 will be positioned to maintain the receiver chopper 34 and cradle 71 in down position, and the attenuator network 89 will be connected between cathode follower 87 and tuned amplifier 90.

At the beginning of the cycle to be considered, the indexing motor 101 is energized by conventional control means (not shown) to index printer wheel 96 to a position suitable for printing the $I_\lambda$ value developed during the first half of this cycle. Simultaneously the motor 101 through a linkage 105 indexes a star cam 106 to shift a switch actuator 107 from left to right. By this shift the actuator 107 causes a movable contact 108 in an auto-transfer switch 109 to open with a fixed contact 110 and to close with a fixed contact 111. Movable contact 108 is connected by lead 112 with the first named of a pair of power lines 113, 114. By the closure of movable contact 108 with fixed contact 109, a circuit energized from the power furnished by these lines is completed as follows: power line 113, lead 112, movable contact 108, fixed contact 111, a lead 120, the third named contact of a set of fixed contacts 121, 122, 123, 124 in an automatic-manual switch 125, the second named contact in a pair of movable contacts 126, 127 for the automatic-manual switch, a lead 130, the first named contact in a pair of movable contacts 131, 132 for a cradle switch 133, the first named contact in a set of fixed contacts 135, 136, 137 for the cradle switch, a lead 140, a junction 141, a lead 142, a junction 143, the cam driving motor 75, a lead 144, and the power line 114. With power flowing in the described circuit the motor 75 is energized to rotate eccentric cam 74 until the cam tilts cradle 71 to its uppermost position. At this uppermost position the closure between movable contact 131 and fixed contact 135 in cradle switch 133 will be broken to deenergize motor 75 to thus stop rotation of cam 74. Accordingly chopper 34 will remain fully extended into beam 25 to chop the radiation thereof for the first half of the new cycle being described.

Meanwhile, in auto-transfer switch 109 the opening of movable contact 108 with fixed contact 110 has broken a power circuit previously existing by the folowing path: power line 113; lead 112, movable contact 108, fixed contact 110, fixed contact 121 and movable contact 126 of automatic-manual switch 125, lead 150, movable contact 132 and fixed contact 137 of cradle switch 133, lead 152, junction 153, lead 154, solenoid 66, lead 155, and power line 114. The solenoid 66 is accordingly deenergized with the result that shutter 17 is urged upwards by spring 65 to cut off the radiation beam 20 from glower 15. The conditions necessary to determine $I_\lambda$ during the presently considered first half cycle are thus completed.

It should be noted that when cam 74 raises cradle 71 to its uppermost position, the movable contact 132 in cradle switch 133 is caused to open with fixed contact 137 and to close with fixed contact 136. This opening and this closure are of no significance during the first half cycle when cradle 71 is in uppermost position. The mentioned opening and closure are, however, of significance in the second half cycle to be soon described.

The deenergization of solenoid 66 in the manner described is accompanied by deenergization of a relay winding 160 connected between junction 153 and power line 114. Relay winding 160 has associated therewith a set of switches 161, 162, 163 comprised of the respective movable contacts 161a, 162a, 163a, the respective left hand fixed contacts 161b, 162b, 163b, and the respective right fixed hand contacts 161c, 162c, 163c. Within these three switches the movable contacts thereof are positionally controlled by the winding 160 such that each movable contact closes with its left hand fixed contact and with its right hand fixed contact when, respectively, the winding is unenergized and energized.

In switch 161 the movable contact 161a is connected with the output of cathode follower 87. In this same switch contacts 161b and 161c are respectively connected with the inputs of attenuator networks 88, 89. In switch 162 the movable contact 162a is connected to the input of the amplifier 90 while the fixed contacts 162c, 162b are respectively connected with the outputs of the attenuators 88, 89. Thus deenergization of winding 160 in the manner described will decouple network 89 and will couple network 88 between cathode follower 87 and tuned amplifier 90. The two networks are adjusted in relative attenuation effect to give the proper quantitative relation between the $I_\lambda$ signal recorded in the first half cycle and the I signal recorded in the second half cycle.

The third switch 163 has its movable contact 163a connected to output lead 60 from rectifying voltmeter 91. The fixed contacts 163b and 163c of this switch are respectively connected through the electrolytic capacitors 170b, 170c to ground. The values of these electrolytic capacitors are individually chosen to give a proper damping effect for the $I_\lambda$ and I signals in the first and second half cycle. Thus the capacitors serve to smooth out unsteady signals. Each of the $I_\lambda$ and I signals has its own capacitor so that when switching from one signal to the other, the average voltage level of the coupled capacitor will not have to be changed. Thus there is avoided the time delay which would ensue if only one capacitor were used to serve both signals in the automatic cycling.

Upon completion of the printing of the $I_\lambda$ signal during the first half of the considered cycle, the motor 101 re-indexes the printer wheel 96 to initiate the second half of the shutter-chopper cycle. Simultaneously, the star cam 106 is reindexed by motor 101 to cause switch actuator 107 to shift movable contact 108 in auto-transfer switch 109 to open with fixed contact 111 and to close with fixed contact 110. By the mentioned closure the movable contact 132 in cradle switch 133 is coupled with power line 113 through the current path heretofore described between this power line and this contact. Also, as mentioned, the movable contact 132 will be closed at this time with fixed contact 136 by virtue of the fact that cradle 71 has not yet changed from its upper position characteristic of the first half cycle. In view of the closure of contacts 132 and 136, the mentioned current path continues on from movable contact 132 as follows: fixed contact 136, junction 141, lead 142, junction 143, cam motor 75, lead 144, and power line 114. Hence the closure of contacts 108 and 110 in auto-transfer switch 109 serves to energize cam motor 75 by connection thereof across the power lines 113, 114.

The cam motor 75 when energized rotates eccentric cam 74 to cause a lowering thereby of cradle 71 to its downward position. On reaching this position the cradle 71 causes movable contact 132 to open with fixed contact 136 and to close with fixed contact 137. The opening of contacts 132 and 136 interrupts the just described power circuit for motor 75 to cause deenergization thereof. Hence cam 74 comes to rest to retain cradle 71 and chopper 34 in down position until such time as motor 75 is re-energized at the beginning of the first half of the next ensuing shutter-chopper cycle.

The described closure of contacts 132 and 137 completes a power circuit from lead 113 to contact 132 as described, and thence by way of contact 137 through solenoid 66 to power line 114 as previously described in connection with the breaking of this same circuit during the first half cycle. The closure of contacts 132 and 137 thus couples solenoid 66 across the power line to pull the shutter 17 downward and thus out of the radiation beam 20 from source 15. With this repositioning of shutter 17 the desired conditions for the second half of the shutter-chopper cycle are fulfilled, namely both the shutter and the receiver chopper 33 are positioned out of their respective radiation beams. Hence, as described, during the second half cycle the only pulsating radiation reaching detector 57 is the source radiation 14 which has been chopped by source chopper 16 (Figure 3) and which thereafter had been partially absorbed by gas 23 in sampling region 21. It follows that, as desired, the second half cycle will be characterized by a recording of the value I.

The same circuit which energizes solenoid 66 also energizes relay winding 160 to cause the movable contact 161a, 162a, 163a, in switches 161, 162, 163 to close with their respectively associated right hand fixed contacts 161c, 162c, 163c. By these closures the attenuator network 89 is coupled between cathode follower 87 and tuned amplifier 90. Also the electrolytic capacitor 170c is coupled between the output of rectifying voltmeter 91 and ground. Thus the attenuator network 88 and electrolytic capacitor 170b, used in the first half cycle to measure the $I_\lambda$ value, are replaced in the second half cycle by the network 89 and capacitor 170c appropriate to measurement of the I value.

It will be noted at this point in the description, that the overall disposition of the circuitry of Figure 5 is the same as that given at the beginning of the description of the events occurring in the first half cycle. Accordingly the circuitry of Figure 5 is adapted to carry out the next ensuing shutter-chopper cycle and those following according to the description just given of a single shutter-chopper cycle.

The recorder unit 61 is so constructed that printing will occur only when the signal supplied to it is steady for a certain interval. If either the $I_\lambda$ or I signal is not steady, the printer wheel 96 ordinarily will not print. For a roughly burning sample of gas 23 there may exist a considerable amount of fluctuation in the signal.

To force the printer wheel to print and continue the cycle, there is provided a circuit organization wherein a timing motor 175 of a timing unit 176 is connected in series with a switch 177 across the power line 113, 114, and wherein a timing switch 178 of the timing unit is serially connected in the power circuit for the balancing motor 100 which motivates the slide wire balancing system 95. The switch 177 by a linkage 179 is mechanically linked with printing wheel 96 to be opened by a printing movement of the wheel down toward the chart 98.

Each time that switch 177 is opened the timing motor 175 is reset to start a new timing cycle. On reaching the end of the timing cycle the motor 175 opens timing switch 178 to deenergize balancing motor 100. When balancing motor 100 is deenergized the balancing system 95 will no longer respond to the random fluctuations of the received $I_\lambda$ or I signal. Hence the printer wheel 96 is steadied in lateral movement to print the last signal value received by the balancing system 95 before the response thereof was broken off. The movement of printer wheel 96 in printing this value opens switch 177 to start a new timing cycle.

In view of the fact that each printed value of the $I_\lambda$ or I signal may have a component representing a random fluctuation the recordings obtained of these signals will be in the nature of respective series of values which are partially random fluctuation. Since each series extends over a long time period, however, compared to the mean frequency of the fluctuations the effect of the random fluctuations may be cancelled out to give proper average values for the signals.

In order to eliminate a spurious mark while the cradle 71 is being raised or lowered to position there is provided the feature of a relay 180 having a winding 181 connected between junction 143 and power line 114, and having a movable contact 182 and a fixed contact 183 conjointly operable as a serially connected switch in the circuit for energizing indexing motor 101 from the power lines 113, 114. Normally the contacts 182, 183 are closed to permit indexing operation of the motor 101 in accordance with the indexing schedule characteristic of the recorder unit 61. When, however, a power circuit is established to energize cam motor 75 for the purpose of changing the position of the cradle 71, the relay winding 181 will also be energized by this power circuit to open the contacts 182, 183. Accordingly the indexing motor 101 cannot be re-operated until the change in position of the cradle has been completed.

The foregoing description of the circuitry of Figure 5 has pertained to a disposition of this circuitry wherein alternate readings of the values $I_\lambda$ and I are obtained by an automatic cycling action. On some occasions, however, it is desirable that one of these readings be obtained continuously. For effecting this continuous reading the automatic-manual switch 125 is thrown to "manual" so that the movable contacts 126, 127 are thrown to open with their respective left hand fixed contacts 121, 123 and to close with their respective right hand fixed contacts 122, 124. The opening of contacts 126, 127 with contacts 121, 123 uncouples the automatic-manual switch 125 from the automatic cycling action initiated by the auto transfer switch 109. The closure of contacts 126, 127 with contacts 122, 124 permits manual selection of the $I_\lambda$ reading or I reading by means of a selector switch 190 having a movable contact 191 coupled with power line 113 and a pair of fixed contacts 192, 193 respectively coupled with the fixed contacts 122, 124 of the automatic manual switch 125.

With the switch 125 thrown to "manual" and with contact 191 of the selector switch 190 thrown to close with contact 193, the cradle 71, if not already in upward position, will be raised to upward position in the manner given in the description of the first half of the automatic cycle. However, in the presently described manual operation, the cradle 71, when once raised, will stay in upward position for the reason that no new circuit is established to energize cam motor 75 for the purpose of lowering the cradle. Similarly, if the automatic-manual switch 125 is thrown to "manual" and the selector switch 190 is thrown to produce closure of its contacts 191 and 192, the cradle 71, if not already down, will be lowered to downward position in the manner given for the second half of the automatic cycle. As before, for manual operation, the cradle 71 when once down will stay down since no new circuit is established for raising the cradle by the operation of the cam motor 75.

It will be seen that the described embodiment when operating under automatic cycling conditions provides for the determination of the temperature of gas 23 by a preferred form of double-sided method wherein alternate values of $I_\lambda$ and I are obtained in rapid succession. On the other hand the described embodiment is also adapted to provide readings for the value $I_\lambda$ only, and is thus also suitable for use in the practice of the described single-sided method.

The described embodiment being illustrative only it will appreciated that the present invention comprehends organizations differing in form or detail from the described embodiment. Accordingly the invention is not to be considered as limited save as is consonant with the scope of the following claims.

We claim:

1. A method for providing plural indications conjointly determinative in at least a relative sense of the temperature of a hot gas, said method comprising the steps of, passing a beam of infra-red radiation through the gas during intermittent time periods of rapid recurrence to produce absorption of the spertrum of said radiation by said gas at an adsorption emission wavelength thereof, collecting in said periods said partially absorbed radiation, collecting radiation emitted at said wavelength by said gas only at times between said periods and determining the respective intensities of said collected partially absorbed radiation and said emission radiation collected at said times, said intensities being conjointly determinative of the temperature of said gas.

2. A method as in claim 1 wherein the beam of radiation passed through said gas is a beam which pulsates at a frequency substantially higher than the frequency of occurrence of said periods.

3. A method as in claim 1 characterized by the further step of recording on a common recording medium and in a mutually distinct manner the respective intensities of said collected partially absorbed radiation and said emission radiation collected at said times.

4. A method for providing plural indications conjointly determinative in at least a relative sense of the approximate temperature of a hot gas, said method comprising the steps of, passing a beam of infra-red radiation through the gas during intermittent time periods of rapid recurrence to produce partial absorption of radiation by said gas at an absorption-emission wavelength thereof, chopping said beam to produce pulsations in said partially absorbed radiation at a substantially higher frequency than the frequency of occurrence of said periods, collecting in said periods said partially absorbed radiation, chopping radiation emitted at said wavelength by said gas during second time periods intervening said first periods to produce pulsations in said emission radiation during only said second periods and at a substantially higher frequency than said occurrence frequency, collecting said pulsating emission radiation during said second periods, and determining the respective intensities of said pulsating partially absorbed radiation so collected and said pulsating emission radiation so collected, said intensities being conjointly determinative of the temperature of said gas.

5. A method as in claim 4 wherein the respective pulsations of said partially absorbed radiation and said emission radiation are both of the same frequency.

6. A method for providing plural indications conjointly determinative in at least a relative sense of the approximate temperature of a hot gas, said method comprising the steps of, generating a continuous beam of infra-red radiation, projecting said beam in an optical path through said gas during intermittent first time periods of rapid recurrence to produce partial absorption of said radiation by said gas at an absorption emission wavelength thereof, chopping said beam to produce pulsations in said partially absorbed radiation at a substantially higher frequency than the occurrence frequency of said first periods, collecting in said optical path during said first periods said partially absorbed radiation unavoidably mixed with unchopped radiation emitted at said wavelength by said gas, developing first alternating electric signals from the pulsations of said partially absorbed radiation, electrically filtering said signals to dissociate same from any component derived from said unchopped emission radiation, chopping the emission radiation in said optical path during second periods intervening said first periods to produce pulsations in said emission radiation during said second periods at a substantially higher frequency than said occurrence frequency, collecting said pulsating emission radiation during said second periods, developing second alternating signals from the pulsations of said collected emission radiation, and determining the quantitative values of said first and second alternating signals, said values being conjointly determinative of the temperature of said gas.

7. Radiant energy measurement apparatus for determining the temperature of a hot gas, said apparatus comprising, infra-red source means adapted to pass a beam of radiation through said gas to produce partial absorption of said radiation by said gas at an absorption-emission wavelength thereof, automatically controlled optical means for cyclically changing a component of the radiation emanating from said gas back and forth in nature between chopped radiation which has been emitted at said wavelength from said gas and chopped radiation from said source means which has been partially absorbed by said gas, and electro-optical means responsive to both said chopped emission radiation and said chopped partially absorbed radiation for producing corresponding electric signals respectively indicative of the intensities thereof.

8. Radiant energy measurement apparatus for determining the temperature of a hot gas, said apparatus comprising, infra-red source means adapted to pass a beam of radiation through said gas to produce partial absorption of said radiation by said gas at an absorption-emission wavelength thereof, automatically controlled optical means for cyclically changing the component at said wavelength of radiation emanating from said gas back and forth in nature between chopped radiation which has been emitted from said gas and chopped radiation from said source means which has been partially absorbed by said gas and which thereafter has been unavoidably mixed with unchopped emitted radiation, electro-optical means responsive to said component of emanating radiation to produce electric signals as a function thereof, said signals having alternating and direct current characteristics in respective correspondence with the presence of chopped and unchopped radiation in said radiation component, means for amplifying said signals only as to the alternating characteristic thereof, and recording means responsive to said amplified signals for producing separate records of the intensities of the partially absorbed radiation and the emission radiation respectively represented by said amplified signals.

9. Apparatus as in claim 8 further characterized by electric circuit means adapted to provide different gain factors for said amplifying means during the respective times when said signals represent partially absorbed radiation and emission radiation.

10. Radiant energy measurement apparatus for determining the temperature of a hot gas comprising, source means adapted to pass a beam of infra-red radiation through said gas with consequent partial absorption of said radiation by said gas at an absorption-emission wavelength thereof, shutter means adapted when operative to cut off said beam from passage through said gas, first chopper means for chopping said beam of radiation prior to said passage, second chopper means adapted when operative to chop the radiation emanating from said gas, and automatic means for controlling as to function performance both said shutter means and second chopper means to alternately render the same operative in unison and inoperative in unison during recurring operative-inoperative cycles, said emanating radiation having accordingly a content of chopped radiation which is alternately in the nature of partially absorbed radiation only and emission radiation only.

11. Radiant energy measurement apparatus for determining the temperature of a hot gas, said apparatus comprising, source means adapted to pass a beam of infra-red radiation through said gas with consequent partial absorption of said radiation by said gas at an absorption-emission wavelength thereof, shutter means adapted when operative to cut off said beam from passage through said gas, first chopper means for chopping said beam prior to said passage, second chopper means adapted when operative to chop the radiation emanating from said gas, automatic means for controlling as to function performance both said shutter means and said second chopper means to alternately render the same operative in unison during intermittent first periods of rapid recurrence and inoperative in unison during second periods intervening said first periods, said emanating radiation being comprised, accordingly, of chopped emission radiation only in said first periods and of a mixture of chopped partially absorbed radiation and unchopped emission radiation in said second periods, electro-optical means responsive to said emanating radiation at said wavelength for producing an output of electric signals which are respectively of alternating form and of mixed alternating and direct form during said first and second periods, the distinctive forms of said signals corresponding, respectively, with the distinctive forms in said periods of said emanating radiation, a signal transfer network adapted by filtering out said direct signals from said second period signals to render the same representative of said partially absorbed radiation only, and recording means responsive to said first period signals and to said filtered second period signals for providing mutually distinct records on a recording medium of the intensities at said wavelength of said partially absorbed and said emission forms of chopped radiation.

12. Apparatus as in claim 11 further characterized by first and second attenuator networks controlled by said automatic means to be respectively interposed in alternation during said first and second periods between said filter network and said recording means, said two networks providing for independent determination of the recorded values of said partial absorption and emission signals.

References Cited in the file of this patent

UNITED STATES PATENTS

| | | |
|---|---|---|
| 2,433,554 | Herzog | Dec. 30, 1947 |
| 2,540,780 | Gabel et al. | Feb. 6, 1951 |
| 2,547,173 | Rittner | Apr. 3, 1951 |
| 2,577,735 | Broomell | Dec. 11, 1951 |
| 2,650,307 | Koppius | Aug. 25, 1953 |
| 2,711,084 | Bergan | June 21, 1955 |
| 2,742,578 | Nicolson et al. | Apr. 27, 1956 |

UNITED STATES PATENT OFFICE
CERTIFICATE OF CORRECTION

Patent No. 2,844,032                      July 22, 1958

William S. Tandler et al.

It is hereby certified that error appears in the printed specification of the above numbered patent requiring correction and that the said Letters Patent should read as corrected below.

Column 2, line 54, for "known at" read --known as--; column 3, line 49, for "shopper" read --chopper--; column 4, line 58, for "that is" read --that it is--; column 6, line 3, for "as the reference" read --at the reference--; line 23, for "black body" read --blackbody--; column 8, line 3, for "bandwith" read --bandwidth--; column 14, line 14, before "appreciated" insert --be--; line 25, for "spertrum" read --spectrum--; column 16, line 69, list of references cited, for the date "Apr. 27, 1956" read --Apr. 17, 1956--.

Signed and sealed this 14th day of October 1958.

(SEAL)
Attest:

KARL H. AXLINE

Attesting Officer

ROBERT C. WATSON
Commissioner of Patents